US005760980A

United States Patent [19]
Lang

[11] Patent Number: 5,760,980
[45] Date of Patent: Jun. 2, 1998

[54] REAR-VIEW MIRROR ASSEMBLY

[75] Inventor: Heinrich Lang, Seenheimer Strasse Lola, D-91465, Egesheim, Germany

[73] Assignees: Heinrich Lang, Ergersheim, Germany; Sabine Lang, Chapin, S.C.

[21] Appl. No.: 620,282

[22] Filed: Mar. 22, 1996

[51] Int. Cl.$^6$ .............................. G02B 7/182; G02B 5/10; G02B 5/08; B60R 1/06

[52] U.S. Cl. .............. 359/872; 359/864; 359/865; 359/871; 359/873; 359/874; 359/875; 359/862; 359/877; 250/474; 250/475.1; 250/476

[58] Field of Search .................................. 359/864, 865, 359/571, 872, 873, 874, 875, 877, 862; 248/474, 475.1, 476, 486

[56] References Cited

U.S. PATENT DOCUMENTS

| | | | |
|---|---|---|---|
| 3,408,136 | 10/1968 | Travis | 359/864 |
| 4,456,333 | 6/1984 | Hewitt | 359/877 |
| 4,747,679 | 5/1988 | Beach, Jr. . | |
| 4,787,726 | 11/1988 | Hendricks | 359/877 |
| 4,929,074 | 5/1990 | Urban | 359/877 |
| 4,991,950 | 2/1991 | Lang et al. . | |
| 5,110,196 | 5/1992 | Lang et al. . | |
| 5,268,796 | 12/1993 | Tomerlin et al. | 359/877 |
| 5,604,644 | 2/1997 | Lang et al. . | |
| 5,621,577 | 4/1997 | Lang et al. . | |
| 5,642,236 | 6/1997 | Mazurek | 359/840 |

FOREIGN PATENT DOCUMENTS

4317314 A1   4/1994   Germany .

OTHER PUBLICATIONS

Moto Mirror Incorporated Brochure, "Increase Blindside Vision, Improve Safety and Savings!", 1990, Arlington, Texas, No Month.
Moto Mirror Incorporated Brochure, Blindiside Economic!, "Expand Your Vision Without Looking for Touble!", 1990, Arlington, Texas, No Month.
Velmac® Brochure, "Fleet Products", 1995, No Month.
"The Tracker™ Remote Control Mirror", Cham–Cal Engineering Co., Garden Grove, California.
Retrac Brochure, "If you are thinking about a motorized mirror take a look at the Pro View Motorized Mirrors from Retrac Mirrors".
"Mekra"Brochure, Mekra Rangau Plastics GmbH & I Co. KG, pp. 1–3 and 15–57.
Patent Application for "Rear–View Mirror, In Particular for Trucks," Filed Dec. 3, 1994, USSN: 08/354,680.

*Primary Examiner*—Paul M. Dzierzynski
*Assistant Examiner*—Mohammad Y. Sikder
*Attorney, Agent, or Firm*—Dority & Manning,P.A.

[57] ABSTRACT

A rear-view mirror assembly is provided for motor vehicles, particularly commercial trucks. A housing defines an interior volume and at least one mirror glass assembly is removably attached to the open front side of the housing. A non-rotatable longitudinal support rod extends completely through the interior volume of the housing in a longitudinal vertical direction. Portions of the support rod extend from the housing at the top and bottom thereof for attaching the mirror to a support structure of the motor vehicle. The housing is manually or remotely rotatable relative to the longitudinal support rod.

22 Claims, 5 Drawing Sheets

REAR-VIEW MIRROR ASSEMBLY

BACKGROUND OF THE INVENTION

The present invention relates to a rear-view mirror assembly, particularly a rotatably adjustable rear-view mirror for commercial vehicles such as trucks.

Rear-view mirrors for commercial vehicles, particularly commercial trucks, are well known in the art. These well known mirrors include mirrors which are rotatable about a longitudinal access through the mirrors either by remote actuation of a motor drive unit or manual adjustment. For example, U.S. Pat. Nos. 4,991,950 and 5,110,196 describe various embodiments of motor driven adjustable rear-view mirrors.

A well known embodiment of a truck rear-view mirror is commonly referred to as a West Coast mirror and is preferably employed for trucks of U.S. American design. Conventional West Coast mirror assemblies can be remotely driven through a motor drive unit or manually adjustable. An example of a West Cost mirror assembly is illustrated, for example, in pending U.S. Pat. No. 5,604,644. With conventional West Coast mirror assemblies, the mirror housing is attached to support arms of the truck with threaded bolts and nuts. The mirror housing supports the entire weight of any motor drive mechanism incorporated in the mirror assembly. For example, in a conventional drive unit, the housing supported the motor drive and also a planetary gear arrangement wherein a stationary gear was fixed directly to the motor housing. Actuation of a drive gear relative to the fixed gear on the housing would cause the motor housing to rotate relative to the bolts used to attach the mirror housing to the vehicle support arms. Accordingly, the mirror housings were formed from relatively high strength materials, typically stainless steel, and were relatively expensive and hard to fabricate.

The present invention relates to an improved West Coast mirror assembly, as described herein.

OBJECTS AND SUMMARY OF THE INVENTION

It is therefore a principle object of the present invention to embody a rear view mirror, particularly for commercial vehicles, wherein the mirror housing is formed of an inexpensive plastic material and is relatively easy to manufacture.

An additional object of the present invention is to provide an improved remotely adjustable or manually adjustable West Coast mirror assembly.

And still another object of the present invention is to provide a motor driven remotely adjustable West Coast mirror assembly which is interchangeable between left-hand and right-hand sides of a vehicle while utilizing the same housing.

Additional objects and advantages of the invention will be set forth in part in the following description, or may be obvious from the description, or may be learned through practice of the invention.

To achieve the objects and in accordance with the purposes of the invention, as embodied and broadly described herein, an embodiment of the present invention includes a rear view mirror for motor vehicles, particularly commercial vehicles. A rear view mirror includes a housing having a back side and an open front side, and defining an interior volume. The housing back side may have a variable radius convex configuration. At least one mirror glass assembly is removably attached to the open front side of the housing. Two longitudinally aligned mirror assemblies may also be attached to the housing. A non-rotatable longitudinal support rod extends completely through the housing interior volume in a longitudinal vertical direction. Portions of the support rod extend from the housing through the top and bottom surfaces thereof. The housing is rotatable relative to the non-rotatably fixed support rod and at least one support rod bearing structure is defined within the housing interior volume on the housing back side and is configured to support rotation of the housing relative to the support rod. Means, such as a threaded nut and bot assembly, are provided for non-rotatably mounting the extending portions of the support rod to a motor vehicle support arm or member. The housing may be manually or remotely rotated relative to the longitudinal support rod.

Preferably, the housing is formed of a relatively inexpensive material, such as plastic. The housing can be, for example, injection molded or blow molded. The mirror is interchangeable between the left-hand and right-hand sides of the vehicle by simply flipping the mirror or rotating the mirror 180 degrees. In a preferred embodiment, the housing is remotely rotatable relative to the longitudinal support rod and includes a motor drive unit configured within the interior volume of the housing. In this embodiment, motor mounts are formed on the back side of the housing which support a motor drive unit having a drive gear. A stationary gear is supported entirely on the longitudinal support rod within the housing and is in engagement with the drive gear. Remote actuation of the motor and drive gear causes the housing to rotate relative to the longitudinal support rod.

In the embodiment incorporating a remotely actuated motor drive, the housing has at least two sets of longitudinally spaced apart motor mounts configured on the back side of the housing. The motor drive unit is interchangeable between the sets of motor mounts so that the mirror can be flipped from one side of the vehicle to the other by simply reorienting or repositioning the motor drive unit between the sets of motor mounts.

The present invention also includes a manually adjustable rear view mirror. However, the identical mirror housing can be incorporated in the manual unit. The motor drive unit and, if desired, fixed gear on the longitudinal support rod, are simply eliminated from this embodiment.

The accompanying drawings, which are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
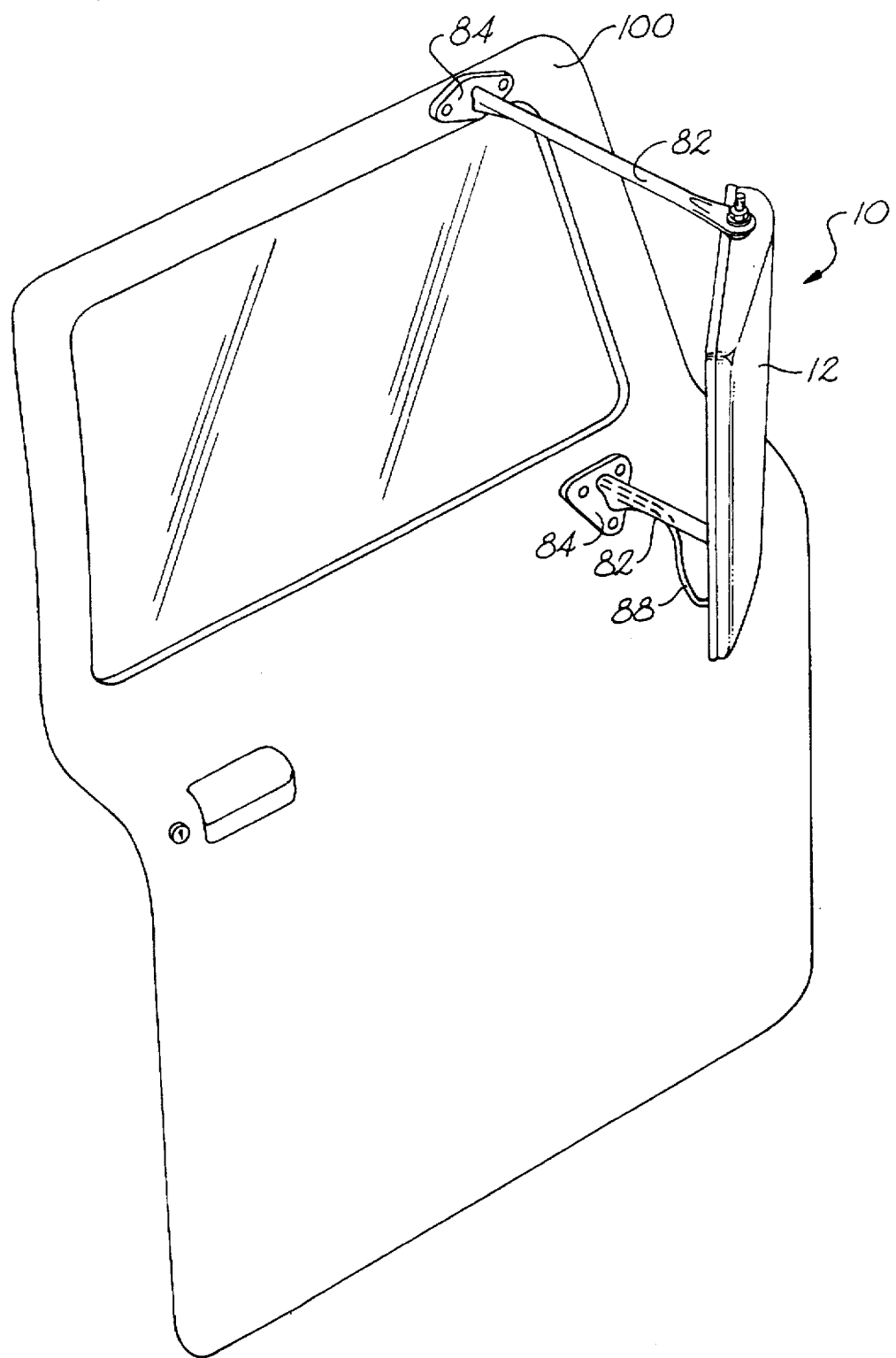
FIG. 1 is a perspective view of a West Coast mirror assembly according to the invention mounted on the door frame of a vehicle.

Reference will now be made in detail to the presently preferred embodiment of the invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. The numbering of components in the drawings is consistent throughout the application, with the same components having the same number in each of the drawings.

The present invention will describe herein as it relates to a commercial vehicle, particularly a commercial truck. However, this is not meant as a limitation of the invention and is for illustrative purposes and ease of explanation. It should be appreciated that the rear-view mirror described herein can be utilized on any manner of vehicle, and any such use is contemplated within the scope and spirit of the invention.

FIG. 1 illustrates a preferred embodiment of the invention. A rear-view mirror 10 is shown mounted to support or retaining arms 82 of a door frame 100 of a motor vehicle. Arms 82 are in turn mounted to frame 100 by means of brackets 84, as is commonly understood in the art. Mirror 10 can be mounted to any manner of conventional bracket and arm assembly. For example, such assemblies are well known which mount to door frames, as shown in FIG. 1, or to cab frames. Mirror 10 can be utilized with any manner of conventional bracket or support assembly.

Mirror 10 illustrated in FIG. 1 is a remotely adjustable mirror, as will be described in detail herein. A power cable 88 extends from housing 12 and preferably runs through lower support arm 82. Power cable 88 is interfaced with the vehicles existing electrical system, as is commonly understood in the art.

Figure 2:
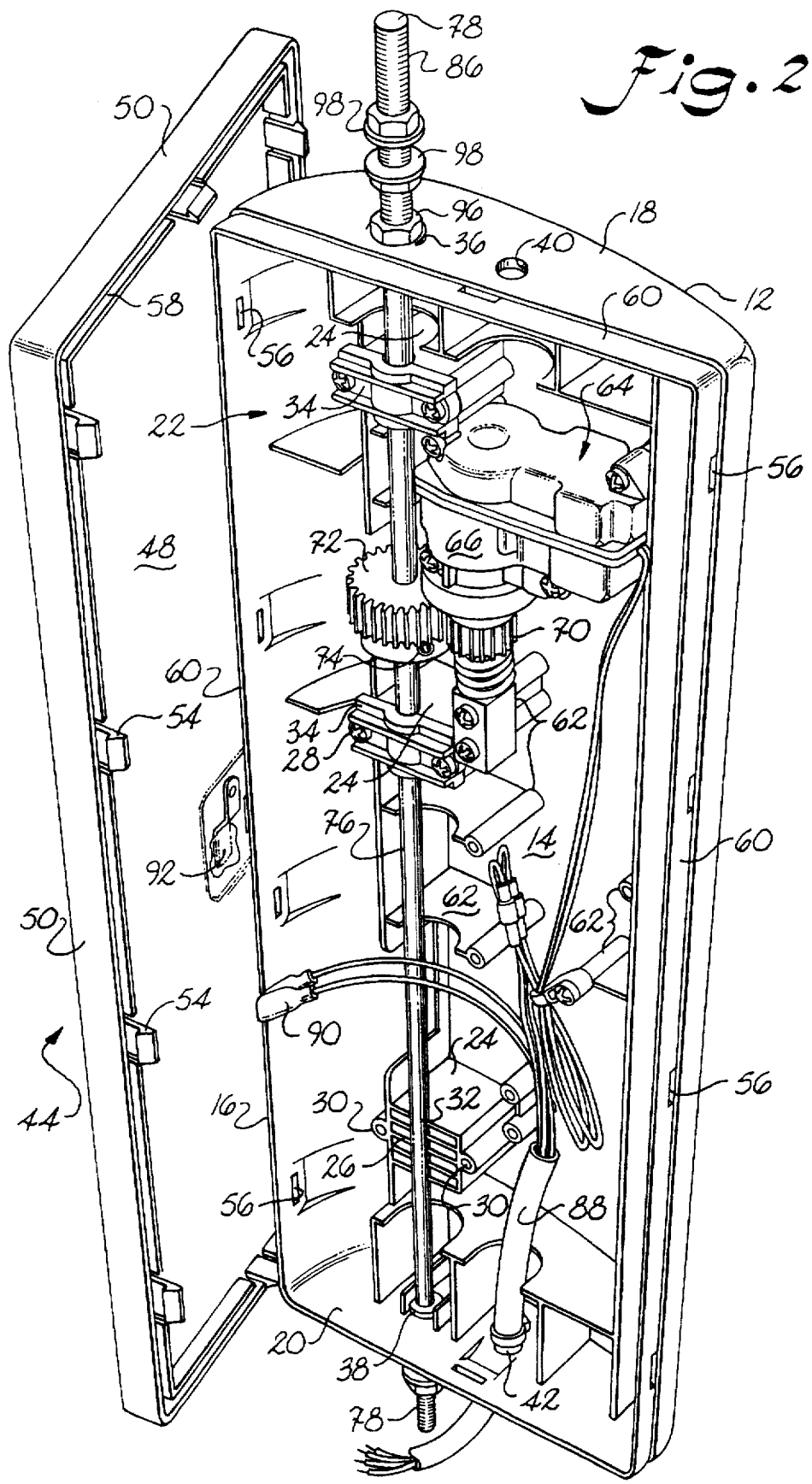
FIG. 2 is a detailed component view of a remote motor driven mirror assembly according to the invention.
Figure 3:
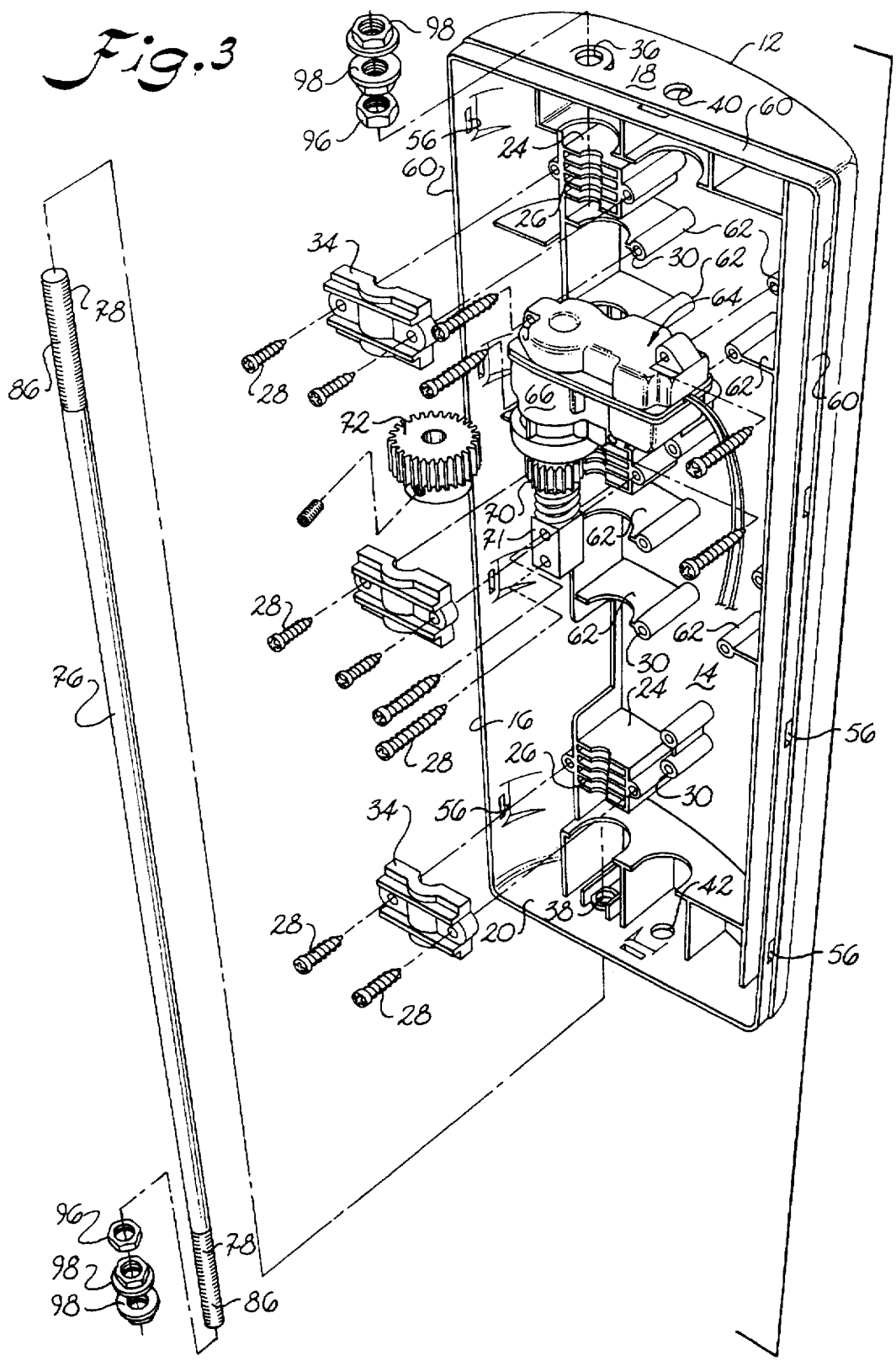
FIG. 3 is an in-line component view of the mirror assembly illustrated in FIG. 2.

FIGS. 2 and 3 illustrate in detail a preferred embodiment of mirror 10, particularly a remotely rotatable mirror. Mirror 10 includes a housing 12. Housing 12 is preferably formed of a lightweight inexpensive material, such as plastic. Housing 12 can be formed by any conventional manner, such as injection molding or blow molding. Housing 12 includes a back side 14, an open front side 16, a top surface 18, and a bottom surface 20. In the embodiment illustrated, back surface 14 is formed as a variable radius convex surface. With this embodiment, as illustrated in FIG. 1, the greatest radius portion of back side 14 is positioned furthest to the vehicle. For example, referring to FIG. 1, the mirror 10 is positioned as a right-hand mirror. It should be understood that mirror 10 is interchangeable between the left-hand and right-hand sides of the vehicles by flipping or turning the mirror 180 degrees, as will be explained in more detail below.

Referring again to FIGS. 2 and 3, mirror 10 also includes at least one mirror glass assembly 44. Mirror glass assembly 44 includes a mirror support plate 48, which is also preferably formed of a lightweight plastic material, and a mirror glass 46 (FIG. 4) fixed to the front side of support plate 48. Support plate 48 includes a rim 50 around the circumference thereof. Rim 50 is preferably tapered towards mirror glass 46 and offers a negligible obstruction to the field of view of a person looking in to the rear-view mirror. A preferred embodiment of the mirror glass and support plate is particularly described in co-pending U.S. Pat. No. 5,604,644, which is incorporated herein in its entirety by reference.

Support plate 48 is removably attached to housing 12 so as to expose interior volume 22 of housing 12. Support plate 48 can be removably attached by any manner of conventional attaching mechanisms. In the embodiment illustrated, support plate 48 includes a plurality of locking wedges 52 spaced around the circumference thereof. Wedges 52 include barb projections 54 disposed at the ends thereof. Barb projections 54 engage in recesses 56 defined around a circumference of housing 12. Support plate 48 also includes a groove 58 defined around a circumference thereof which engages with a circumferential border edge 60 defined on housing 12. Support plate 48 is removable from housing 12 by inserting a tool or device between rim 50 and housing 12 causing barbs 54 to disengage from recesses 56. Thus, the interior volume of housing 12 is accessible with relatively little effort or special tools.

Mirror 10 includes a non-rotatable longitudinal support rod 76 extending completely through interior volume 22 of housing 12 in the vertical longitudinal direction. Support rod 76 is formed of a relatively strong material, such as steel. Support rod 76 includes extending portions 78 extending through holes 36, 38 in top and bottom surfaces 18, 20 respectively. Extending portions 78 include threads 86 defined thereon. Nuts 96 are utilized to mount housing 12 relative to support rod 76. Flange nuts 98, or any conventional nut and bolt assembly or other attaching devices, are used to mount mirror 10 to a support member or arms 82 of a vehicle, as particularly seen in FIG. 1 and commonly understood in the art. Support rod 76 is non-rotatable relative to the vehicle support.

Housing 12 includes at least one support rod bearing structure, such as bearing block or web 24. Bearing blocks 24 are preferably molded integral with housing 12 and include bearing recesses 32 for receipt of rod 76. In the embodiment illustrated, bearing blocks or webs 24 include individual ribs 26 which define bearing recess 32. A bearing cap 34 is mounted by means of screws 28 and screw holes 30. The support rod bearing blocks allows for relative rotation between housing 12 and fixed support rod 76.

Housing 12 is manually or remotely adjustably rotatable relative to longitudinal support rod 76. In the embodiments illustrated in FIGS. 2 and 3, housing 12 is remotely adjustable by means of remotely actuated motor drive unit 64. In this embodiment, housing 12 includes at least one set of motor mounts 62 formed on back side 14 of housing 12 within interior volume 22. Referring particularly to FIG. 3, motor drive unit 64 includes a motor 66 mounted to one set of motor mounts 62, which includes four individual mounts. The motor is mounted with conventional screws 28 engaging in screw holes 30. Motor 66 includes a spring biased shaft and drive gear 70 having a bearing block 71 mounted to motor mounts 62. A power cable 88 enters interior volume 22 through hole 42 defined in bottom surface 20 of housing 12. When mirror 10 is switched from a right-hand mirror, as illustrated in FIG. 2, to a left-hand mirror, as particularly illustrated in FIG. 5, power cable 88 enters through hole 40 defined in top surface 18. Top surface 18 becomes a bottom surface when the mirror is interchanged to the other side of the vehicle. Power cable 88 can include additional leads 90 to provide power to a defrosting unit 92 if such a unit is included with mirror assembly 44, as is well known in the art.

Figure 5:
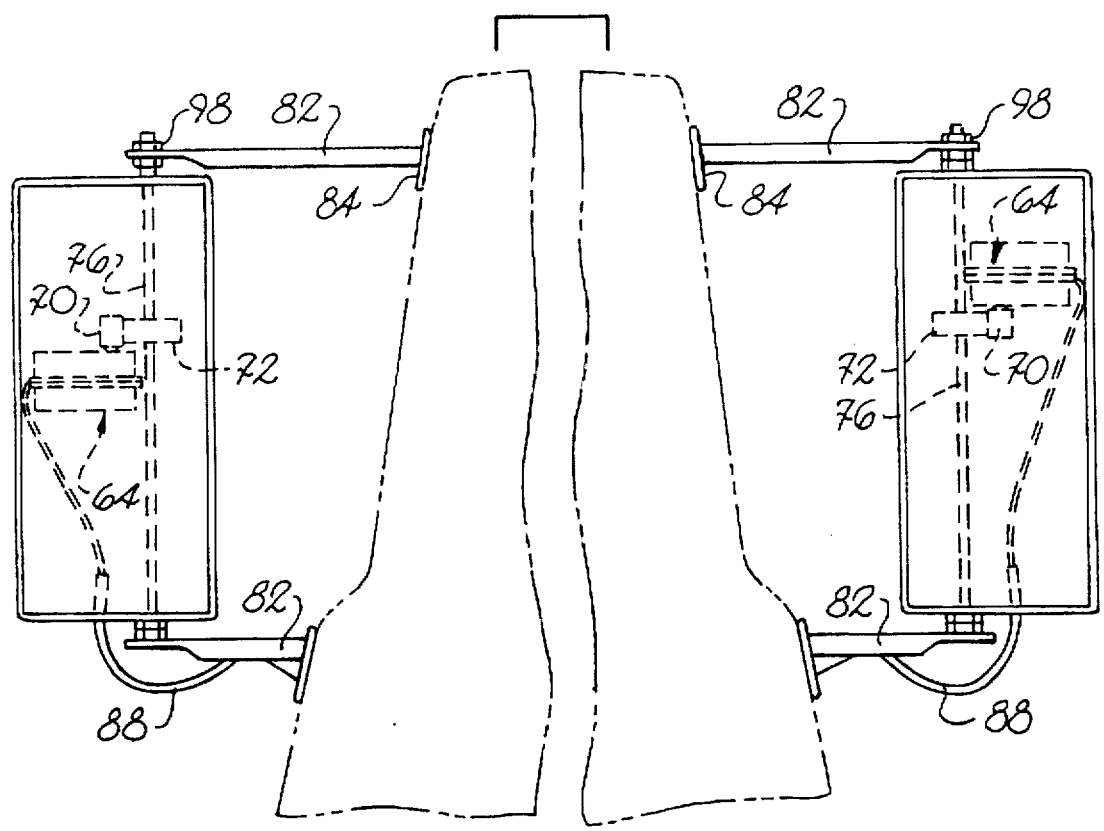
FIG. 5 is a partial perspective view of a rear-view mirror according to the invention particularly illustrating the interchangeable left-hand and right-hand features thereof.

In a preferred embodiment, mirror 10 is capable of being interchanged between the left-hand and right-hand sides of the vehicle, as particularly illustrated in FIG. 5, without requiring changeout of housing 12. In this embodiment, housing 12 is flipped or rotated 180 degrees to be interchanged between opposite sides of the vehicle. To interchange the mirror, motor driving unit 64 must be repositioned and reoriented within interior volume 22. In this regard, housing 12 includes at least one additional set of motor mounts 62 longitudinally spaced apart from the first set of motor mounts 62 described above, as particularly seen in FIGS. 2 and 3. To switch from a right-hand mirror illustrated in FIG. 2, to a left-hand mirror illustrated in FIG. 5, motor driving unit 64 is removed and repositioned to the bottom most motor mounts 62 shown in FIGS. 2 and 3. Bearing block 71 attaches to the same motor mount 62. In other words, motor driving unit 64 will be upside down within interior volume 22 and power cable 18 will extend through opposite hole 40 defined in top surface 18. The relative positioning of motor driving unit 64 is clearly illustrated in FIG. 5.

Any manner of conventional motor drive units may be utilized in the present invention. One such preferred unit is a standard twelve volt motor drive unit. Any manner of conventional drive unit can be utilized in this regard and a detailed explanation of such motor drive units is not necessary for an understanding of the present invention. Additionally, remote actuation of drive unit 64 by way of a switch or other device located inside the cab of the vehicle is also commonly understood in the art and a detailed explanation thereof is not necessary.

Longitudinal support rod 76 includes a gear, such as spur gear 72, non-rotatably fixed on the rod by means of, for example, set screw 74. Gear 72 is in engagement with drive gear 70 of motor drive unit 64. Thus, it should be understood that when motor drive unit 64 is remotely actuated causing drive gear 70 to rotate relative to fixed gear 72, housing 12 is caused to rotate relative to support rod 76. The operation is the same regardless of which side of the vehicle the mirror is utilized on.

Figure 4:
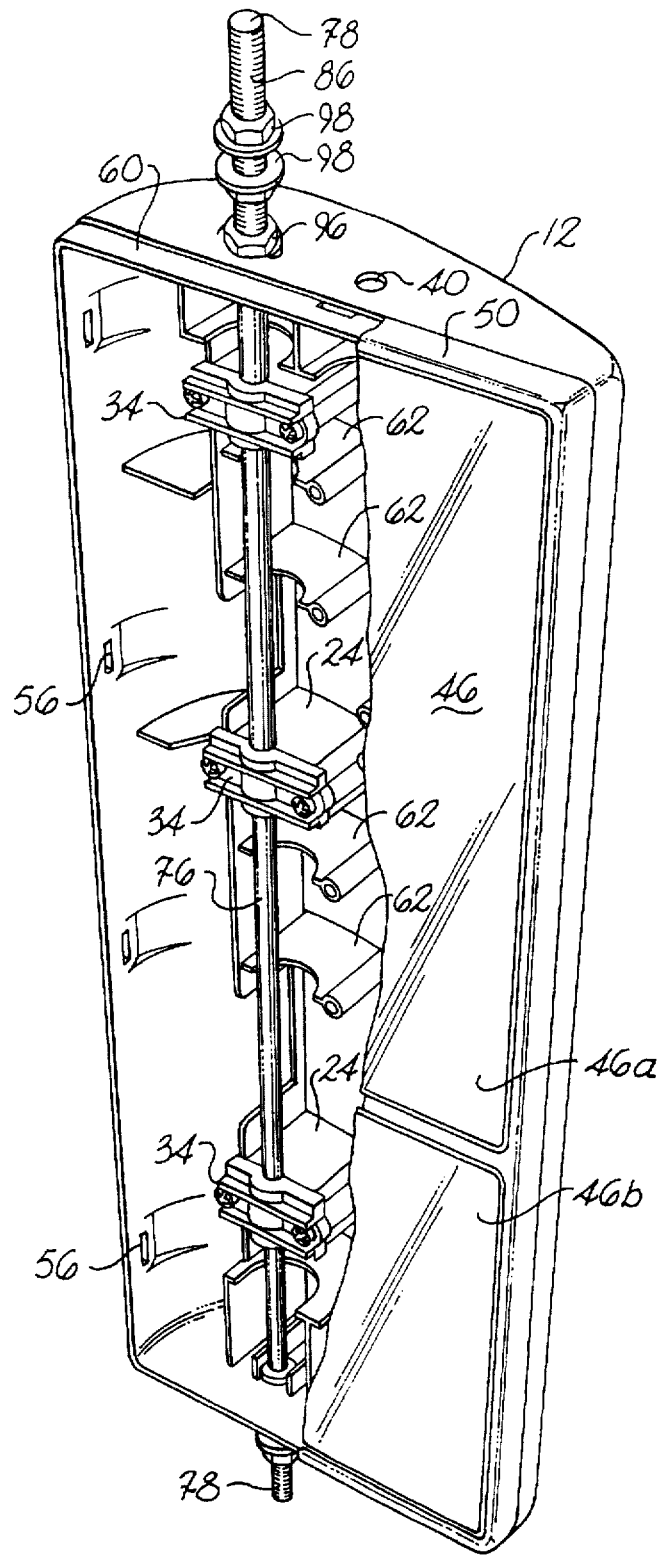
FIG. 4 is a partial cut-away view of a manually adjustable mirror assembly according to the invention.

The present invention also includes a manually adjustable mirror, as particularly illustrated in FIG. 4. In this embodiment, the identical housing 12 described above is utilized and the motor drive unit 64 and fixed gear 72 are simply removed from the apparatus. In this regard, housing 12 is particularly versatile. The mirror illustrated in FIG. 4 can be readily converted to a motorized mirror by simply installing fixed gears 72 and motor drive unit 64.

It will be apparent to those skilled in the art that various modifications and variations can be made in the apparatus of the present invention without departing from the scope or spirit of the invention. For example, various configurations of motor drive units and motor mounts can be configured within housing 12 to achieve the purposes and objects of the invention. Thus, it is intended that the present invention cover such modifications and variations of the invention provided they come within the scope of the appended claims and their equivalents.

What is claimed is:

1. A rear-view mirror for motor vehicles, comprising:

a housing, said housing having a back side, an open front side, and an interior volume;

at least one mirror glass assembly removably attached to said open front side of said housing;

a non-rotatable longitudinal support rod extending completely through said housing interior volume in a longitudinal vertical direction with portions of said support rod extending from said housing at a top and bottom thereof, at least one support rod bearing structure defined within said housing interior volume on said housing back side and configured to support rotation of said housing relative to said support rod, said housing being remotely adjustable relative to the longitudinal support rod;

means for non-rotatably mounting said extending portions to a motor vehicle support member; and a motor drive unit with a drive gear supported by said housing and a stationary gear supported entirely on said longitudinal support rod within said housing interior volume, said drive gear engaging said stationary gear causing said housing to rotate relative to said longitudinal support rod.

2. The rear-view mirror as in claim 1, wherein said housing is formed of a plastic material, and said support rod bearing structure comprises a plastic-bearing block molded integral with said housing.

3. The rear-view mirror as in claim 1, wherein said housing back side comprises a convex configuration.

4. The rear-view mirror as in claim 1, wherein said mirror glass assembly comprises a mirror glass support plate removably attached to said housing front side, and a mirror glass fixed to said mirror glass support plate.

5. The rear-view mirror as in claim 1, wherein said housing comprises at lest two sets of longitudinally spaced apart motor mounts formed thereon within said interior volume, said motor drive unit being interchangeable between said sets of motor mounts so that said rear-view mirror can be used as a right-hand or left-hand mirror.

6. The rear-view mirror as in claim 5, wherein said housing is formed of a plastic material and said motor mounts are molded integral with said housing.

7. The rear-view mirror as in claim 1, wherein said means for non-rotatably mounting said extending portions comprises a threaded nut and bolt assembly for attaching said extending portions to retaining arms of a vehicle support member.

8. The rear-view mirror as in claim 1, further comprising an additional mirror glass assembly removably attached to said housing wherein said rear-view mirror has at least two vertically aligned mirror surfaces.

9. A rear-view mirror for motor vehicles, particularly commercial trucks, comprising:

a housing, said housing formed of a plastic material and having a back side, an open front side, top and bottom surfaces, and an interior volume, said housing further comprising at least a first set of motor mounts formed on said back side facing said interior volume;

a mirror glass support plate removably attached to said open front side of said housing;

a mirror glass fixed to a front side of said mirror glass support plate;

a longitudinal support rod extending completely through said housing interior volume in a longitudinal vertical direction with portions of said support rod extending from said housing top and bottom surfaces, said longitudinal support rod further comprising a non-rotatable gear fixed at a longitudinal position thereon;

a plurality of rod bearing web structures within said housing interior volume formed integral on said housing back side and configured to support rotation of said housing relative to said support rod;

a motor drive mechanism removably attached to said motor mounts within said interior volume between at least two of said rod bearing web structures, said motor drive mechanism comprising a drive gear configured in driving engagement with said fixed gear on said longitudinal support rod; and wherein said housing is automatically adjustably rotatable relative to said longitudinal support rod by remote actuation of said motor drive mechanism whereby rotation of said drive gear relative to said fixed gear causes said housing to rotate relative to said longitudinal support rod.

10. The rear-view mirror as in claim 9, further comprising at least one additional set of said motor mounts longitudinally spaced from said first set of motor mounts, said motor drive mechanism being interchangeable between said motor mounts.

11. The rear-view mirror as in claim 10, wherein said rear-view mirror is a left-hand or right-hand mirror and can be used on either side of a motor vehicle by flipping said housing and repositioning said motor drive mechanism to said additional set of motor mounts.

12. A rear-view mirror assembly for motor vehicles, comprising:

a vehicle support member configured for mounting on a motor vehicle, said vehicle support member further comprising longitudinally spaced retaining arms;

means for mounting said vehicle support member to a motor vehicle;

an interchangeable left-hand or right-hand mirror mountable to said vehicle support member retaining arms, said mirror further comprising a housing, said housing having a variable radius convex back side, an open front side, top and bottom surfaces, and an interior volume, said housing further comprising at least two sets of motor mounts formed integral on said back side facing said interior volume;

a mirror glass support plate removably attached to said open front side of said housing, and a mirror glass fixed to a front side of said mirror glass support plate;

a longitudinal support rod extending completely through said housing interior volume in a longitudinal vertical direction with portions of said support rod extending from said housing top and bottom surfaces, said support rod further comprising a non-rotatable gear fixed thereon;

a plurality of rod bearing web structures within said housing interior volume formed integral on said housing back side and configured to support rotation of said housing relative to said support rod;

a motor drive mechanism removably mounted to one set of motor mounts within said interior volume between at least two of said rod bearing web structures, said motor drive mechanism comprising a drive gear configured in driving engagement with said fixed gear; and wherein said housing is automatically adjustably rotatable relative to said longitudinal support rod by remote actuation of said motor drive mechanism whereby rotation of said drive gear rotates relative to said fixed gear causes said housing to rotate relative to said longitudinal support rod.

13. A rear-view mirror assembly for motor vehicles for receiving a mirror glass assembly and for attachment to a motor vehicle support member, the rear-view mirror assembly comprising:

a housing, said housing having a back side, an open front side, and an interior volume, the mirror glass assembly being removably attachable to said open front side of said housing;

a non-rotatable longitudinal support rod extending completely through said housing interior volume in a longitudinal vertical direction with portions of said support rod extending from said housing at a top and bottom thereof;

at least one support rod bearing structure defined within said housing interior volume on said housing back side and configured to support rotation of said housing relative to said support rod, said housing being remotely adjustably rotatable relative to said longitudinal support rod;

means for non-rotatably mounting said extending portions to the motor vehicle support member; and a motor drive unit with a drive gear supported by said housing and a stationary gear supported entirely on said longitudinal support rod within said housing interior volume, said drive gear engaging said stationary gear causing said housing to rotate relative to said longitudinal support rod.

14. The rear-view mirror assembly as in claim 13, wherein said housing is formed of a plastic material and said support rod bearing structure comprises a plastic bearing block molded integral with said housing.

15. The rear-view mirror assembly as in claim 14, wherein said housing back side comprises a convex configuration.

16. The rear-view mirror assembly as in claim 13, wherein said housing comprises at lest two sets of longitudinally spaced apart motor mounts formed thereon within said interior volume, said motor drive unit being interchangeable between said sets of motor mounts so that said rear-view mirror assembly can be used as a right-hand or left-hand mirror.

17. The rear-view mirror assembly as in claim 16, wherein said housing is formed of a plastic material and said motor mounts are molded integral with said housing.

18. The rear-view mirror assembly as in claim 13, wherein said means for non-rotatably mounting said extending portions comprises a threaded nut and bolt assembly for attaching said extending portions to retaining arms of the vehicle support member.

19. A rear-view mirror assembly for motor vehicles for receiving a mirror glass assembly comprising:

a housing, said housing formed of a plastic material and having a back side, an open front side, top and bottom surfaces, and an interior volume, said housing further comprising at least a first set of motor mounts formed on said back side facing said interior volume, the mirror glass assembly being removably attachable to said open front side of said housing;

a longitudinal support rod extending completely through said housing interior volume in a longitudinal vertical direction with portions of said support rod extending from said housing top and bottom surfaces, said longitudinal support rod further comprising a non-rotatable gear fixed at a longitudinal position thereon;

a plurality of rod bearing web structures within said housing interior volume formed integral on said housing back side and configured to support rotation of said housing relative to said support rod;

a motor drive mechanism removably attached to said motor mounts within said interior volume between at least two of said rod bearing web structures, said motor drive mechanism comprising a drive gear configured in driving engagement with said fixed gear on said longitudinal support rod; and wherein said housing is automatically adjustably rotatable relative to said longitudinal support rod by remote actuation of said motor drive mechanism whereby rotation of said drive gear relative to said fixed gear causes said housing to rotate relative to said longitudinal support rod.

20. The rear-view mirror assembly as in claim 19, further comprising at least one additional set of said motor mounts longitudinally spaced from said first set of motor mounts, said motor drive mechanism being interchangeable between said motor mounts.

21. The rear-view mirror assembly as in claim 20, wherein said rear-view mirror assembly is a left-hand or right-hand mirror and can be used on either side of a motor vehicle by flipping said housing and repositioning said motor drive mechanism to said additional set of motor mounts.

22. An interchangeable left-hand or right-hand rear-view mirror assembly for motor vehicles for receiving a mirror glass assembly and mountable to vehicle support member retaining arms, the rear-view mirror assembly comprising:

a housing, said housing having a variable radius convex back side, an open front side, top and bottom surfaces, and an interior volume, said housing further comprising at least two sets of motor mounts formed integral on said back side facing said interior volume, the mirror glass assembly being removably attachable to said open front side of said housing;

a longitudinal support rod extending completely through said housing interior volume in a longitudinal vertical direction with portions of said support rod extending from said housing top and bottom surfaces, said support rod further comprising a non-rotatable gear fixed thereon;

a plurality of rod bearing web structures within said housing interior volume formed integral on said housing back side and configured to support rotation of said housing relative to said support rod;

a motor drive mechanism removably mounted to one set of motor mounts within said interior volume between at least two of said rod bearing web structures, said motor drive mechanism comprising a drive gear configured in driving engagement with said fixed gear; and wherein said housing is automatically adjustably rotatable relative to said longitudinal support rod by remote actuation of said motor drive mechanism whereby rotation of said drive gear rotates relative to said fixed gear causes said housing to rotate relative to said longitudinal support rod.

\* \* \* \* \*